(12) United States Patent
Yu

(10) Patent No.: US 11,648,502 B2
(45) Date of Patent: May 16, 2023

(54) CYLINDRICAL FILTER DEVICE, MANUFACTURING METHOD AND USAGE OF THE SAME, AND FILTER SYSTEM HAVING THE SAME

(71) Applicant: GREENFILTEC LTD., Taoyuan (TW)

(72) Inventor: Yi-Hui Yu, Taoyuan (TW)

(73) Assignee: GREENFILTEC LTD., Taoyuan (TW)

( * ) Notice: Subject to any disclaimer, the term of this patent is extended or adjusted under 35 U.S.C. 154(b) by 280 days.

(21) Appl. No.: 16/934,979

(22) Filed: Jul. 21, 2020

(65) Prior Publication Data

US 2021/0077944 A1 Mar. 18, 2021

(30) Foreign Application Priority Data

Sep. 12, 2019 (TW) .................. 108133058

(51) Int. Cl.
*B01D 53/00* (2006.01)
*B01D 53/04* (2006.01)

(52) U.S. Cl.
CPC .... *B01D 53/0415* (2013.01); *B01D 2253/102* (2013.01); *B01D 2259/4508* (2013.01)

(58) Field of Classification Search
CPC ............ B01D 53/0415; B01D 53/0431; B01D 53/0407; B01D 2253/102;
(Continued)

(56) References Cited

U.S. PATENT DOCUMENTS 3,058,594 A * 10/1962 Hultgren ................ B01D 29/21
210/493.5
3,348,695 A * 10/1967 Rosaen ................ B01D 39/083
55/528

(Continued)

FOREIGN PATENT DOCUMENTS

CN 2581042 Y 10/2003
EP 1 391 233 A1 2/2004
(Continued)

*Primary Examiner* — Jacob M Amick
*Assistant Examiner* — Sherman D Manley
(74) *Attorney, Agent, or Firm* — Birch, Stewart, Kolasch & Birch, LLP

(57) ABSTRACT

A cylindrical filter device of the present invention includes a wavy filter screen, a sealing device, and a connecting device. The wavy filter screen includes a first flexible side strip, a second flexible side strip opposite to the first flexible side strip, and a plurality of wavy structures disposed between the first flexible side strip and the second flexible side strip. The wavy filter screen wraps to form a cylindrical structure with respect to an axis. The opposite ends of the cylindrical structure are respectively wrapped to form a first opening and a second opening by the first flexible side strip and the second flexible side strip. The sealing device is disposed at the first opening and has a first groove. The first flexible side strip is able to engage with the first groove with its elasticity and makes the first opening be sealed by the sealing device. The connecting device is disposed at the second opening. The connecting device has a second groove and a port. The second flexible side strip is able to engage with the second groove with its elasticity and makes the second opening communicate with the port.

19 Claims, 14 Drawing Sheets

(58) Field of Classification Search
CPC ........ B01D 2259/4508; B01D 39/2065; B01D 39/2062; B01D 2239/0407; B01D 2239/0618; B01D 2258/06; B01D 46/0001; B01D 46/0036; B01D 46/2411; B01D 46/521; B01D 46/02; B01D 46/52
See application file for complete search history.

(56) References Cited

U.S. PATENT DOCUMENTS

| | | | | |
|---|---|---|---|---|
| 3,543,940 A * | 12/1970 | Schmidt, Jr. | ........... | B01D 27/06 210/507 |
| 3,726,408 A * | 4/1973 | Gewiss | ........... | B32B 29/02 210/493.5 |
| 3,747,303 A * | 7/1973 | Jordan | ........... | F02M 35/04 55/482 |
| 3,867,294 A * | 2/1975 | Pall | ........... | B01D 29/21 210/489 |
| 3,933,643 A * | 1/1976 | Colvin | ........... | B01D 39/2013 55/498 |
| 4,036,616 A * | 7/1977 | Byrns | ........... | B01D 46/0012 55/498 |
| 4,062,781 A * | 12/1977 | Strauss | ........... | B01D 46/2403 55/501 |
| 4,087,260 A * | 5/1978 | Strathoff | ........... | B01D 53/0423 95/143 |
| 4,130,487 A * | 12/1978 | Hunter | ........... | B01D 39/2079 210/489 |
| 4,184,966 A * | 1/1980 | Pall | ........... | B29C 66/723 55/497 |
| 4,234,326 A * | 11/1980 | Bailey | ........... | B01D 53/0407 502/424 |
| 4,339,250 A * | 7/1982 | Thut | ........... | B01D 46/2411 454/231 |
| 4,419,241 A * | 12/1983 | Hoffmann | ........... | B01D 29/111 55/497 |
| 4,559,066 A * | 12/1985 | Hunter | ........... | B01D 46/64 55/498 |
| 4,735,720 A * | 4/1988 | Kersting | ........... | B01D 29/111 55/498 |
| 4,838,901 A * | 6/1989 | Schmidt | ........... | B01D 46/30 95/287 |
| 4,859,386 A * | 8/1989 | VanderBilt | ........... | C02F 1/283 264/DIG. 48 |
| 4,878,930 A * | 11/1989 | Manniso | ........... | D04H 1/492 210/321.82 |
| 4,886,533 A * | 12/1989 | Sakashita | ........... | B01D 46/2407 55/498 |
| 5,082,476 A * | 1/1992 | Kahlbaugh | ........... | B01D 39/14 55/486 |
| 5,114,508 A * | 5/1992 | Miyagi | ........... | B29C 65/5042 156/218 |
| 5,238,474 A * | 8/1993 | Kahlbaugh | ........... | B01D 46/521 55/486 |
| 5,246,472 A * | 9/1993 | Herman | ........... | F01N 13/1894 96/380 |
| 5,350,515 A * | 9/1994 | Stark | ........... | B01D 29/111 156/218 |
| 5,427,597 A * | 6/1995 | Osendorf | ........... | B01D 39/1623 55/528 |
| 5,505,753 A * | 4/1996 | Heysek | ........... | B01D 46/444 96/417 |
| 5,556,440 A * | 9/1996 | Mullins | ........... | B01D 46/2414 55/498 |
| 5,611,831 A * | 3/1997 | Matsuoka | ........... | B01D 39/2017 55/501 |
| 5,651,250 A * | 7/1997 | Kawamura | ........... | B01D 39/2086 60/303 |
| 5,669,949 A * | 9/1997 | Dudrey | ........... | B01D 46/2411 96/191 |
| 5,679,248 A * | 10/1997 | Blaney | ........... | B01D 39/2062 264/45.9 |
| 5,762,796 A * | 6/1998 | Zraik | ........... | B01D 29/21 156/DIG. 47 |
| 5,779,747 A | 7/1998 | Schlör et al. | | |
| 5,858,044 A * | 1/1999 | Nepsund | ........... | F02M 35/024 55/486 |
| 5,873,920 A * | 2/1999 | Wong | ........... | B01D 46/2411 55/528 |
| 6,099,606 A * | 8/2000 | Miller | ........... | F02M 35/024 55/482 |
| 6,171,684 B1 * | 1/2001 | Kahlbaugh | ........... | B01D 39/1623 442/389 |
| 6,274,041 B1 * | 8/2001 | Williamson | ........... | B01D 53/0431 210/243 |
| 6,383,244 B1 * | 5/2002 | Wake | ........... | B01D 46/62 55/482 |
| 6,416,561 B1 * | 7/2002 | Kallsen | ........... | B01D 29/96 55/482 |
| 6,447,567 B1 * | 9/2002 | Ehrenberg | ........... | B01D 46/2414 55/498 |
| 6,652,614 B2 * | 11/2003 | Gieseke | ........... | B01D 46/2414 55/482 |
| 6,712,870 B1 * | 3/2004 | Stamey, Jr. | ........... | B01D 46/24 55/501 |
| 6,949,155 B1 * | 9/2005 | Lang | ........... | B01D 29/012 156/203 |
| 7,237,682 B2 * | 7/2007 | Reynolds | ........... | B01D 29/96 210/450 |
| 8,317,890 B2 * | 11/2012 | Raether | ........... | B01D 46/522 55/498 |
| 8,757,394 B2 * | 6/2014 | Maier | ........... | B29C 66/83221 55/497 |
| 9,266,043 B2 * | 2/2016 | Han | ........... | B01D 29/111 |
| 9,861,922 B1 * | 1/2018 | Townsend | ........... | B01D 46/0005 |
| 11,504,664 B2 * | 11/2022 | Bessone | ........... | B01D 46/0005 |
| 2003/0196419 A1 * | 10/2003 | Peter | ........... | B01D 46/64 55/482 |
| 2005/0284115 A1 * | 12/2005 | Hung | ........... | F01N 3/0226 55/498 |
| 2010/0170208 A1 * | 7/2010 | Matula | ........... | B01D 46/521 55/344 |
| 2011/0209612 A1 * | 9/2011 | Bansal | ........... | B01D 46/2407 55/482 |
| 2011/0278242 A1 * | 11/2011 | Levy | ........... | C02F 1/283 210/489 |
| 2012/0055126 A1 * | 3/2012 | Whittier | ........... | B01D 53/0431 55/482 |
| 2012/0138523 A1 * | 6/2012 | Matula | ........... | B01D 46/009 210/232 |
| 2013/0056428 A1 * | 3/2013 | Levy | ........... | C02F 1/283 210/489 |
| 2014/0137743 A1 * | 5/2014 | Reeh | ........... | B01D 53/0415 96/151 |
| 2014/0260982 A1 * | 9/2014 | Williams | ........... | B01D 46/2414 55/509 |
| 2016/0339377 A1 * | 11/2016 | Arakawa | ........... | B01D 46/521 |
| 2020/0030731 A1 * | 1/2020 | Dhau | ........... | B01D 53/007 |
| 2021/0331007 A1 * | 10/2021 | Cresswell | ........... | A62B 7/10 |

FOREIGN PATENT DOCUMENTS

| | | |
|---|---|---|
| JP | 11-156126 A | 6/1999 |
| JP | 2004-89982 A | 3/2004 |
| JP | 2011-121056 A | 6/2011 |
| JP | 2013-688 A | 1/2013 |
| JP | 2016-168519 A | 9/2016 |
| TW | 201919746 A | 6/2019 |

* cited by examiner

CYLINDRICAL FILTER DEVICE, MANUFACTURING METHOD AND USAGE OF THE SAME, AND FILTER SYSTEM HAVING THE SAME

BACKGROUND

Technical Field

The present invention relates to a cylindrical filter device, a manufacturing method and a usage of the same, and a filter system having the same. More specifically, the present invention relates to a cylindrical filter device for filtering gaseous molecular contaminants, a manufacturing method of the same, and a filter system having the same.

Related Art

In the field of industrial manufacturing, such as semiconductor manufacturing industry, in order to further improve the product yield, clean rooms are widely used to produce and manufacture products in clean pollution-free isolated environments. In order to meet the environmental requirements of the clean rooms, fans and filter equipment are generally disposed at air inlets of the clean rooms, so that airflows are driven by the fans to pass through filter screens of the filter equipment and then enter the clean rooms to filter contaminants.

In the contaminants, gaseous molecular contaminants do not have a fixed shape like dust and cannot be filtered out by controlling the pore size of the filter screens, so they are commonly removed by using activated carbon materials. As shown in a conventional activated carbon filter cartridge 70 in FIG. 1, activated carbon particles 73 are disposed between inner and outer layers of reticular structures 71 and 72 made of polymers such as acrylonitrile butadiene styrene (ABS) or a metal such as stainless steel, and then, the opposite ends of the filter cartridge are sealed by cover bodies 74 and 75. Since gaps are formed among the activated carbon particles 73, and the vibration of the activated carbon particles 73 may be caused when gas flows through the gaps, the activated carbon particles 73 collide with each other to generate fragments, and the increase of the dust amount and the seepage of substances such as tar in the activated carbon particles are caused. Additionally, the conventional activated carbon filter cartridge filled with the activated carbon particles 73 has heavy weight and is inconvenient to replace and transport. Therefore, the conventional activated carbon filter cartridge has a space for improvement.

SUMMARY

An objective of the present invention is to provide a cylindrical filter device with the advantages of low dust, easy replacement, filter material saving, convenient transportation and storage and the like.

Another objective of the present invention is to provide a filter system having the cylindrical filter device, with the advantages of low cost, easy maintenance and the like.

Another objective of the present invention is to provide a usage of the cylindrical filter device, with the advantages of low dust, easy replacement, filter material saving, convenient transportation and storage and the like.

The cylindrical filter device of the present invention includes a wavy filter screen, a sealing device, and a connecting device. The wavy filter screen includes a plurality of wavy structures, a first flexible side, and a second flexible side strip. The first flexible side strip is disposed on one side of the plurality of wavy structures, and is perpendicular to ridge lines of the plurality of wavy structure. The second flexible side strip is disposed on one side of the plurality of wavy structures opposite to the first flexible side, and is perpendicular to ridge lines of the plurality of wavy structures. The opposite ends of each ridge lines of the wavy structures are respectively connected with the first flexible side strip and the second flexible side strip; wherein ridge lines of the wavy structures are respectively perpendicular to the first flexible side strip and the second flexible side strip. The wavy filter screen wraps to form a cylindrical structure with respect to an axis so that the ridge lines of the wavy structures are parallel to the axis; corresponding sides of first and last wavy structures of the plurality of wavy structures are in direct or indirect connection in a separable manner; and the opposite ends of the cylindrical structure are respectively wrapped to form a first opening and a second opening by the first flexible side and the second flexible side. The sealing device is disposed at the first opening, wherein the sealing device has a first groove. The width of the first groove is slightly smaller than the height of the first flexible side strip for the first flexible side strip to engage with the first groove with its elasticity and makes the first opening be sealed by the sealing device. The connecting device is disposed at the second opening, wherein the connecting device has a second groove and a port, and wherein the width of the second groove is slightly smaller than the height of the second flexible side strip for the second flexible side strip is able to engage with the second groove with its elasticity and makes the second opening communicate with the port.

In an embodiment of the present invention, the wavy filter screen further includes a connecting piece for fixing the corresponding sides of the connected first and last wavy structures.

In an embodiment of the present invention, the cylindrical filter device further includes a supporting device, disposed in the cylindrical structure and respectively connected and supported between the sealing device and the connecting device.

In an embodiment of the present invention, the wavy filter screen includes an activated carbon filter screen.

In an embodiment of the present invention, the height of the first flexible side strip and the height of the second flexible side strip are greater than the thickness of the plurality of wavy structures.

In an embodiment of the present invention, the value of (H×N×2)/D is in a range of 3 to 30. H is the thickness of the plurality of wavy structures, N is the number of the plurality of wavy structures, and D is the inner diameter of the cylindrical structure.

The filter system of the present invention includes a cavity and the above-mentioned cylindrical filter device. The cavity includes a cavity inlet and a first inner surface with a cavity outlet. The cylindrical filter device is disposed and connected to the first inner surface in a way that the axis is perpendicular to the first inner surface so as to make the port communicate with the cavity outlet. The cavity outlet, the port and the cavity inlet jointly form an airflow path. The wavy filter screen is positioned on the airflow path.

In an embodiment of the present invention, the cavity further includes a butt joint device disposed on the first inner surface and corresponding to the position of the cavity outlet. The connecting device is in butt joint with the butt joint device so that the cylindrical filter device is fixed to the first inner surface, and the first opening is communicated with the cavity outlet.

In an embodiment of the present invention, the cavity inlet is positioned on the opposite side of the first inner surface. The axis is parallel to a horizontal plane.

The manufacturing method of the cylindrical filter device of the present invention includes: (S1000) providing a wavy filter screen, wherein the wavy filter screen includes a plurality of wavy structures, a first flexible side strip, and a second flexible side strip. The first flexible side strip is disposed on one side of the plurality of wavy structures, and is perpendicular to ridge lines of the plurality of wavy structures. The height of the first flexible side strip is greater than the thickness of the plurality of wavy structures. The second flexible side strip is disposed on one side of the plurality of wavy structures opposite to the first flexible side, and is perpendicular to ridge lines of the plurality of wavy structures. The height of the second flexible side strip is greater than the thickness of the plurality of wavy structures. The opposite ends of each ridge lines of the wavy structures are respectively connected with the first flexible side strip and the second flexible side strip; wherein ridge lines of the wavy structures are respectively perpendicular to the first flexible side strip and the second flexible side strip; (S2000) wrapping the wavy filter screen to form a cylindrical structure with respect to an axis so that the ridge lines of the wavy structures are parallel to the axis, directly or indirectly connecting corresponding sides of first and last wavy structures of the plurality of wavy structures in a separable manner, and respectively wrapping the opposite ends of the cylindrical structure to form a first opening and a second opening by the first flexible side strip and the second flexible side strip; (S3000) disposing the sealing device at the first opening, wherein the sealing device has a first groove, wherein the width of the first groove is slightly smaller than the height of the first flexible side strip for the first flexible side strip to engage with the first groove with its elasticity and make the first opening be sealed by the sealing device; and (S4000) disposing the connecting device at the second opening, wherein the connecting device has a second groove and a port, wherein the width of the second groove is slightly smaller than the height of the second flexible side strip for the second flexible side to engage with the second groove with its elasticity and make the second opening communicate with the port.

In an embodiment of the present invention, the manufacturing method of the cylindrical filter device further includes: fixing the corresponding sides of the connected first and last wavy structures by using a connecting piece.

The usage of the cylindrical filter device of the present invention is used to filter gas entering a building space.

DETAILED DESCRIPTION

Figure 1:
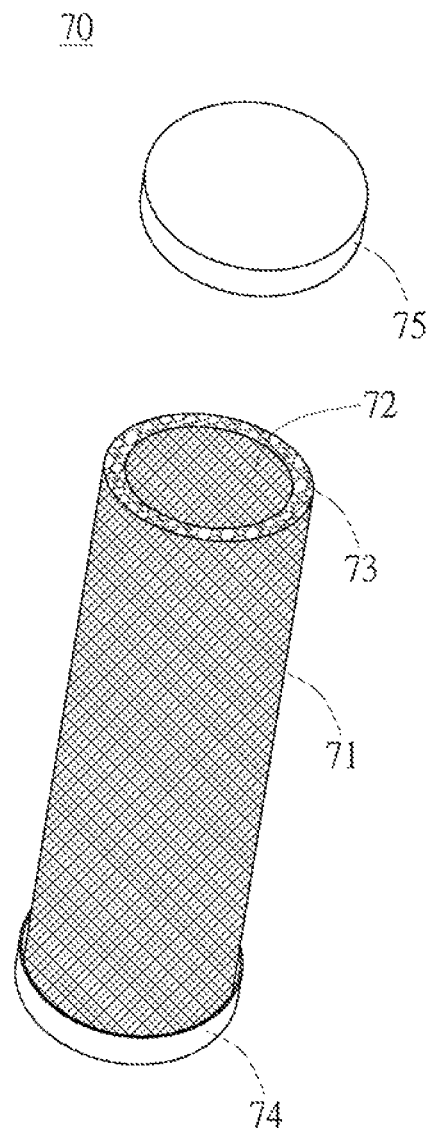
FIG. 1 is a schematic diagram of a conventional activated carbon filter cartridge.
Figure 2A:
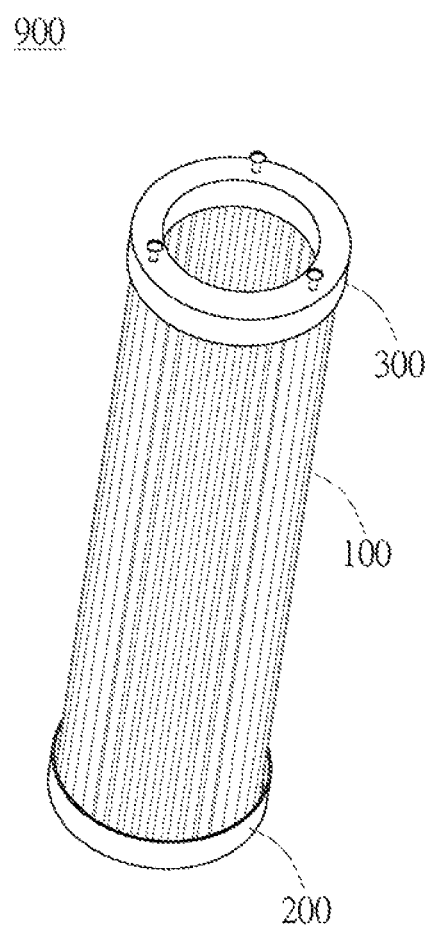
FIG. 2A is a schematic diagram of an embodiment of a cylindrical filter device according to the present invention.
Figure 2B:
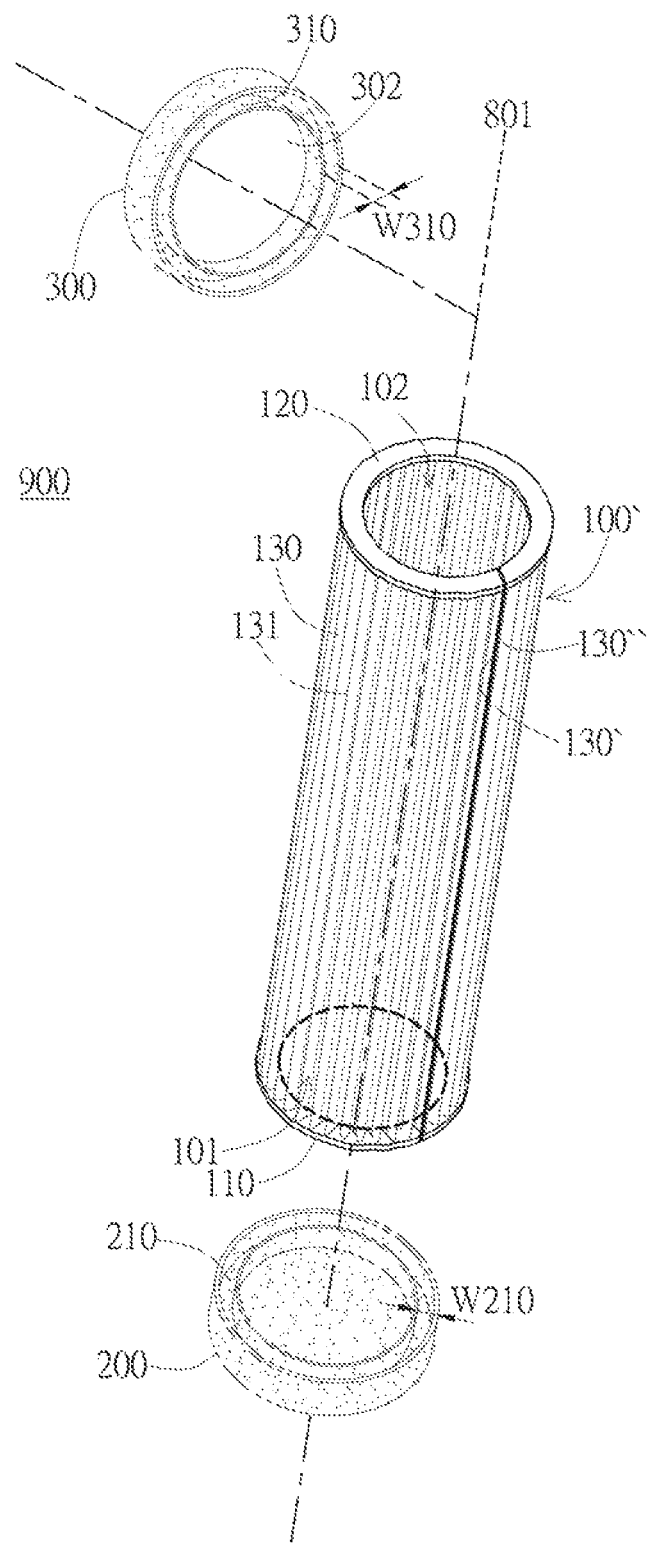
FIG. 2B is a schematic exploded view of the embodiment of the cylindrical filter device according to the present invention.
Figure 2C:
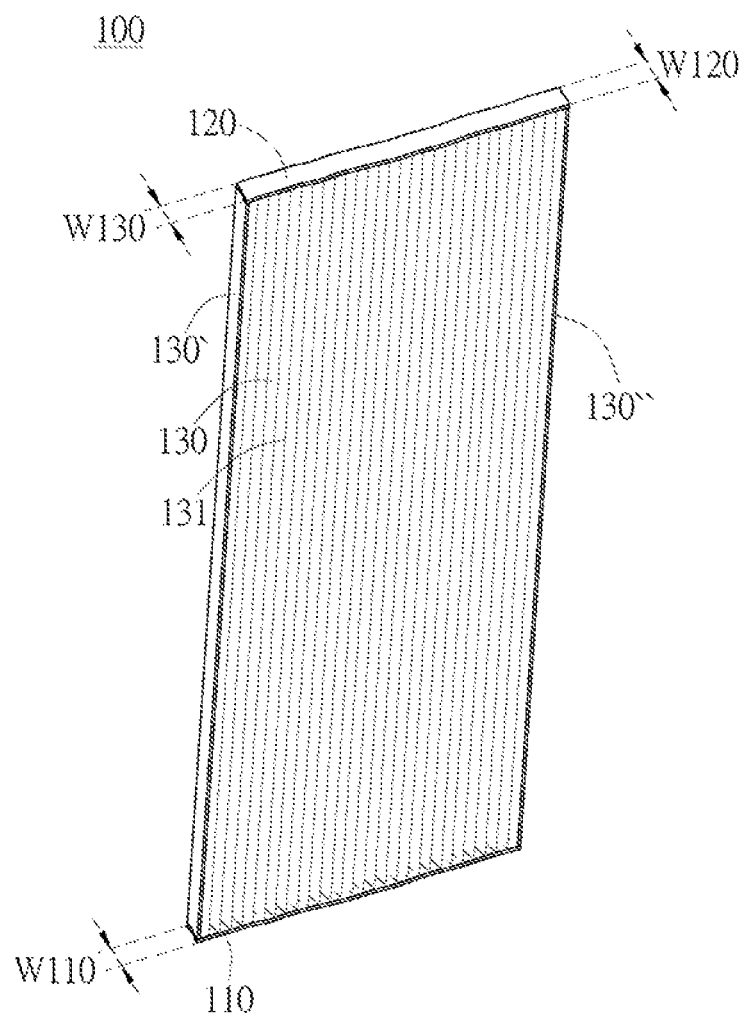
FIG. 2C is a schematic diagram of an embodiment of a wavy filter screen of the cylindrical filter device according to the present invention.

According to a schematic diagram of an embodiment shown in FIG. 2A and a schematic exploded view of the embodiment shown in FIG. 2B, a cylindrical filter device 900 includes a wavy filter screen 100, a sealing device 200, and a connecting device 300. The wavy filter screen 100 preferably uses, for example, nonwoven fabrics to fix filter materials of activated carbon particles therein. However, in different embodiments, a wavy filter screen 100 may use other porous objects or structures to fix filter materials such as ion exchange resin, zeolite materials, organic metal skeleton materials, molecular sieves, aluminum oxide, silicon dioxide and functional polymers. More specifically, the cylindrical filter device 900 is assembled by the wavy filter screen 100 curled to be wrapped into a cylindrical shape, the sealing device 200, and the connecting device 300. As shown in FIG. 2C, before being curled, the wavy filter screen 100 may be in a flat plane state, and includes a first flexible side strip 110, a second flexible side strip 120 opposite to the first flexible side strip, and a plurality of wavy structures 130 disposed between the first flexible side strip 110 and the second flexible side strip 120. Ridge lines 131 of the wavy structures 130 are respectively connected with, and preferably perpendicular to the first flexible side strip 110 and the second flexible side strip 120. The height W110 of the first flexible side strip 110 and the height W120 of the second flexible side strip 120 are slightly greater than the thickness W130 of the plurality of wavy structures. The cylindrical shape is preferably a round cylindrical shape. However, in different embodiments, the cylindrical shape may be other cylindrical shapes with different cross section shapes according to manufacturing or use requirements, etc.

As shown in FIG. 2B, since the wavy structure 130 is flexible at least based on a wavy design, and the first flexible side strip 110 and the second flexible side strip 120 are flexible at least based on elasticity, the wavy filter screen 100 may wrap to form a cylindrical structure 100' with respect to an axis 801 so that the ridge lines 131 of the wavy structure 130 are parallel to the axis 801. Corresponding sides 130' and 130" of first and last wavy structures of the plurality of wavy structures 130 are in direct or indirect connection in a separable manner. The direct connection includes direct contact. The indirect connection includes sandwiching another object such as a magnet therebetween. The opposite ends of the cylindrical structure 100' are respectively wrapped to form a first opening 101 and a second opening 102 by the first flexible side strip 110 and the second flexible side strip 120. The first flexible side strip 110 and the second flexible side strip 120 may select and use elastic thermoplastic materials such as polyurethane (PU), silica gel, ethylene vinyl acetate (EVA), ethylene propylene rubber (EPM) and ethylene propylene diene monomer (EPDM).

Figure 3A:
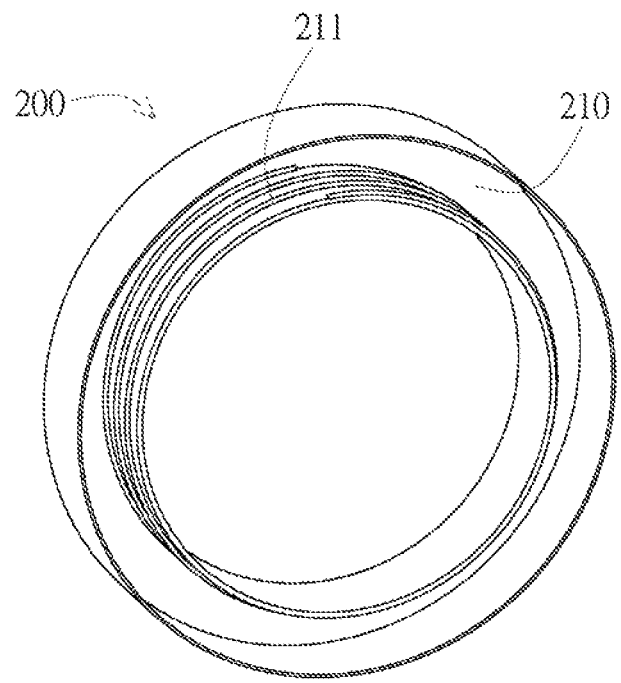
FIGS. 3A and 3B are schematic diagrams of different embodiments of a sealing device according to the present invention.
Figure 3B:
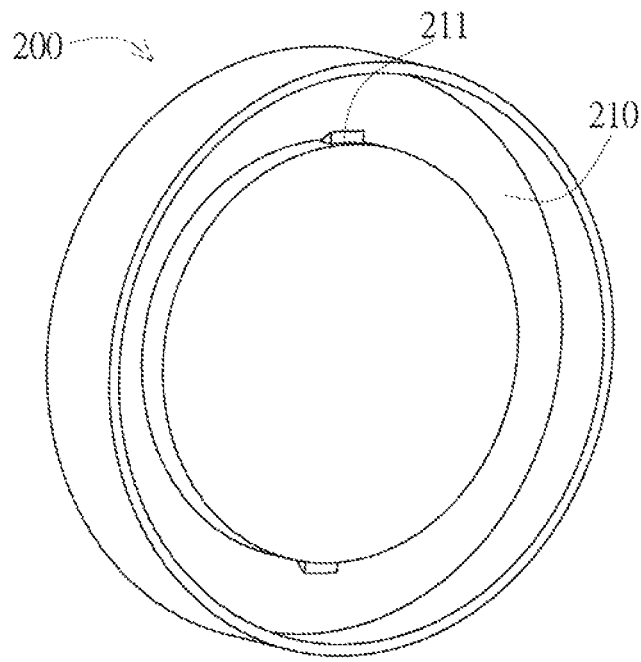

As shown in FIG. 2B, the sealing device 200 is disposed at the first opening 101, and the connecting device 300 is disposed at the second opening 102. More specifically, according to the embodiment shown in FIG. 2B, the sealing device 200 has a first groove 210. The first flexible side strip 110 is able to tightly engage with the first groove 210 with its elasticity and can increase airtightness, and makes the first opening 101 be sealed by the sealing device 200. The connecting device 300 has a second groove 310 and a port 302. The second flexible side strip 120 is able to tightly engage with the second groove 310 with its elasticity and can increase airtightness, and makes the second opening 102 communicate with the port 302. The width W210 of the first groove 210 and the width W310 of the second groove 310 are slightly smaller than the height W110 of the first flexible side strip 110 and the height W120 of the second flexible side strip 120 respectively, and are slightly greater than the thickness W130 of the plurality of wavy structures, so that tightness of engaging the first flexible side strip 110 and the second flexible side strip 120 with the first groove 210 and the second groove 310 is improved. Additionally, according to embodiments shown in FIGS. 3A and 3B, the sealing device 200 may be further provided with an engaging structure 211 such as screw threads or movable mortises and tenons at a side of the first groove 210, so that the first flexible side strip 110 more stably engages with the first groove 210.

Figure 4A:
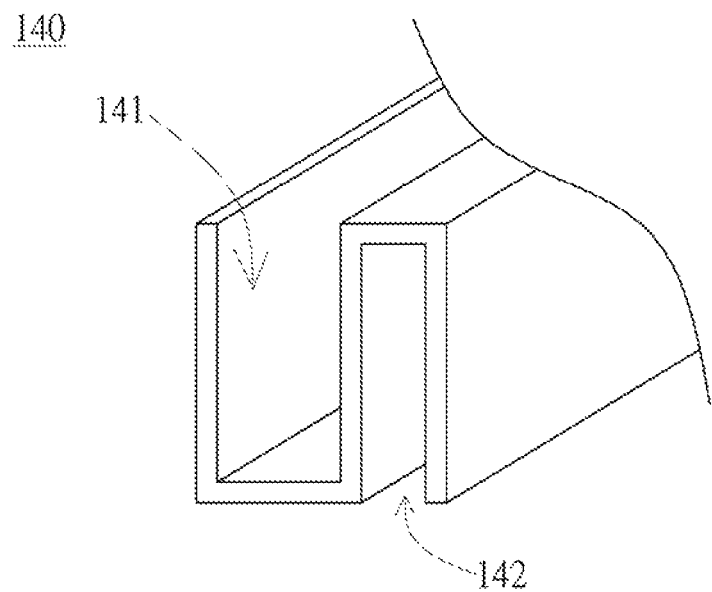
FIG. 4A is a schematic diagram of an embodiment of a connecting piece according to the present invention.
Figure 4B:
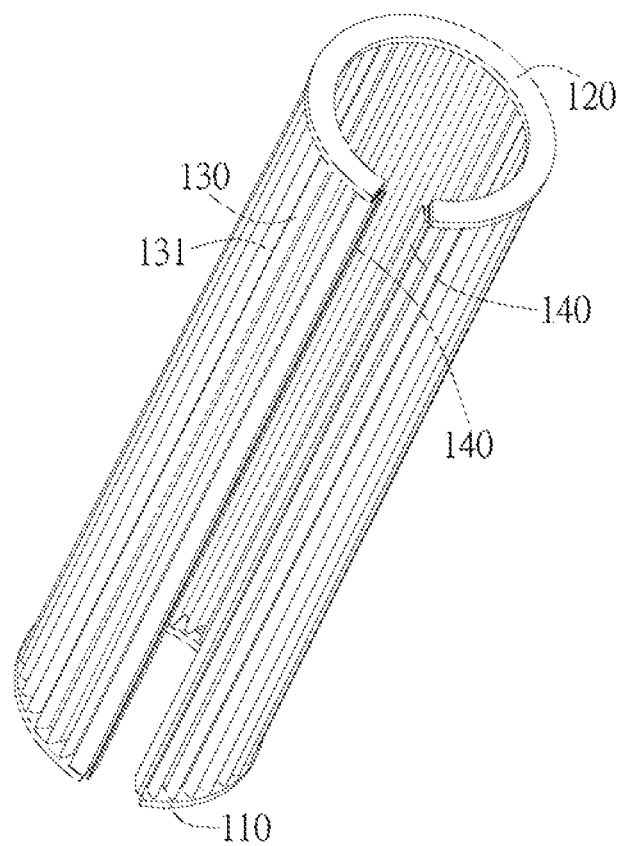
FIGS. 4B to 4E are schematic diagrams of embodiments of fixing corresponding sides of connected first and last wavy structures by using the connecting piece according to the present invention.
Figure 4C:
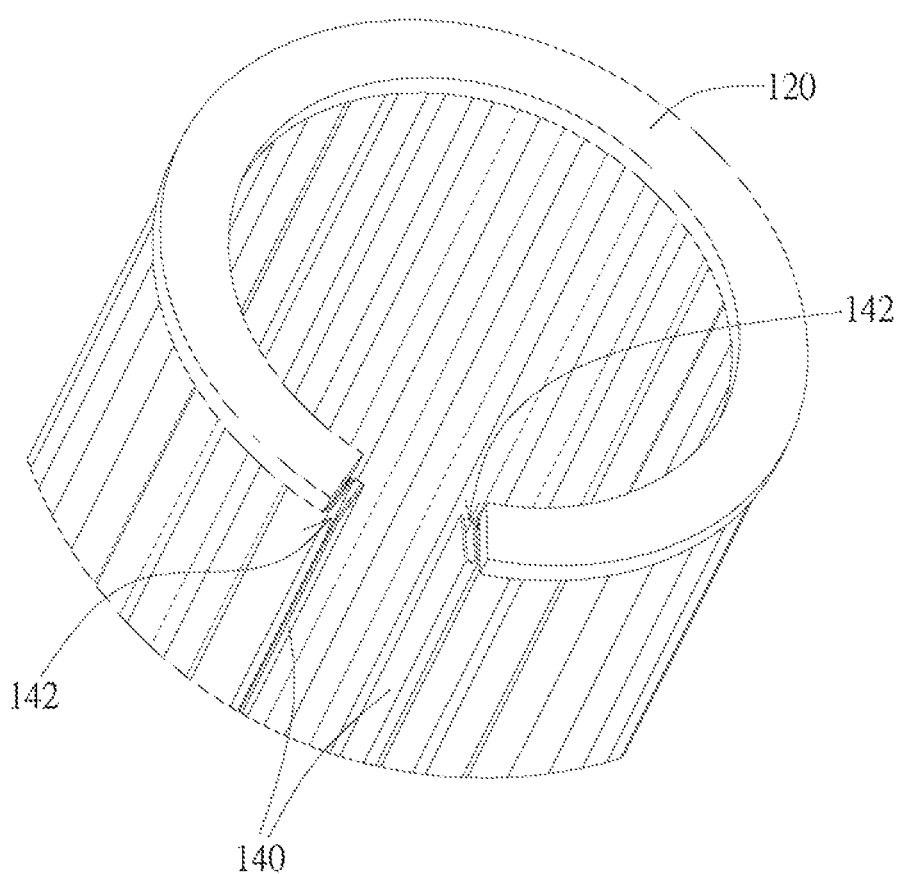
Figure 4D:
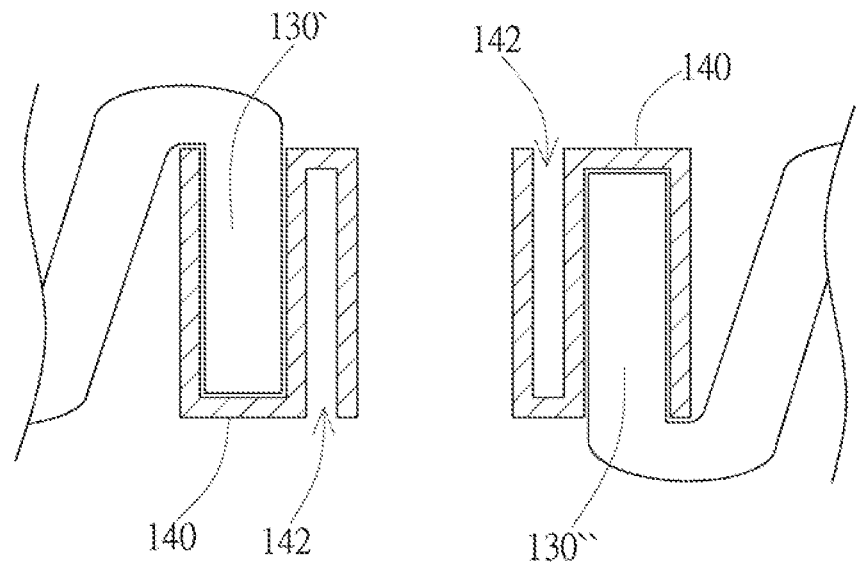
Figure 4E:
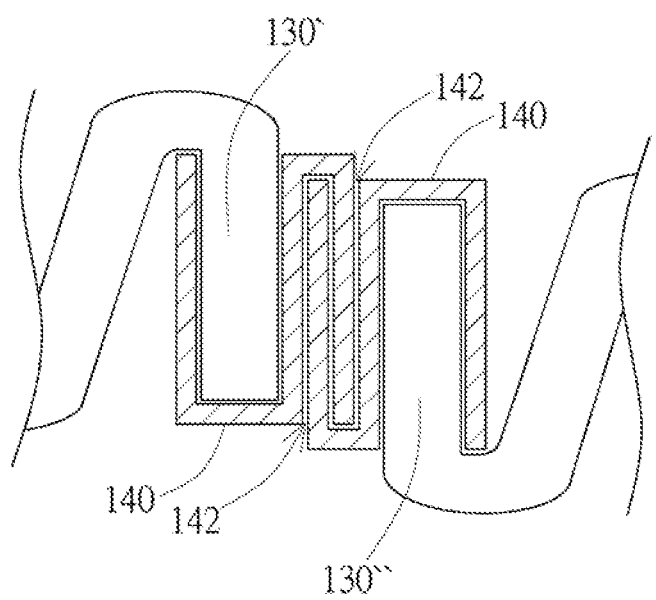
Figure 5:
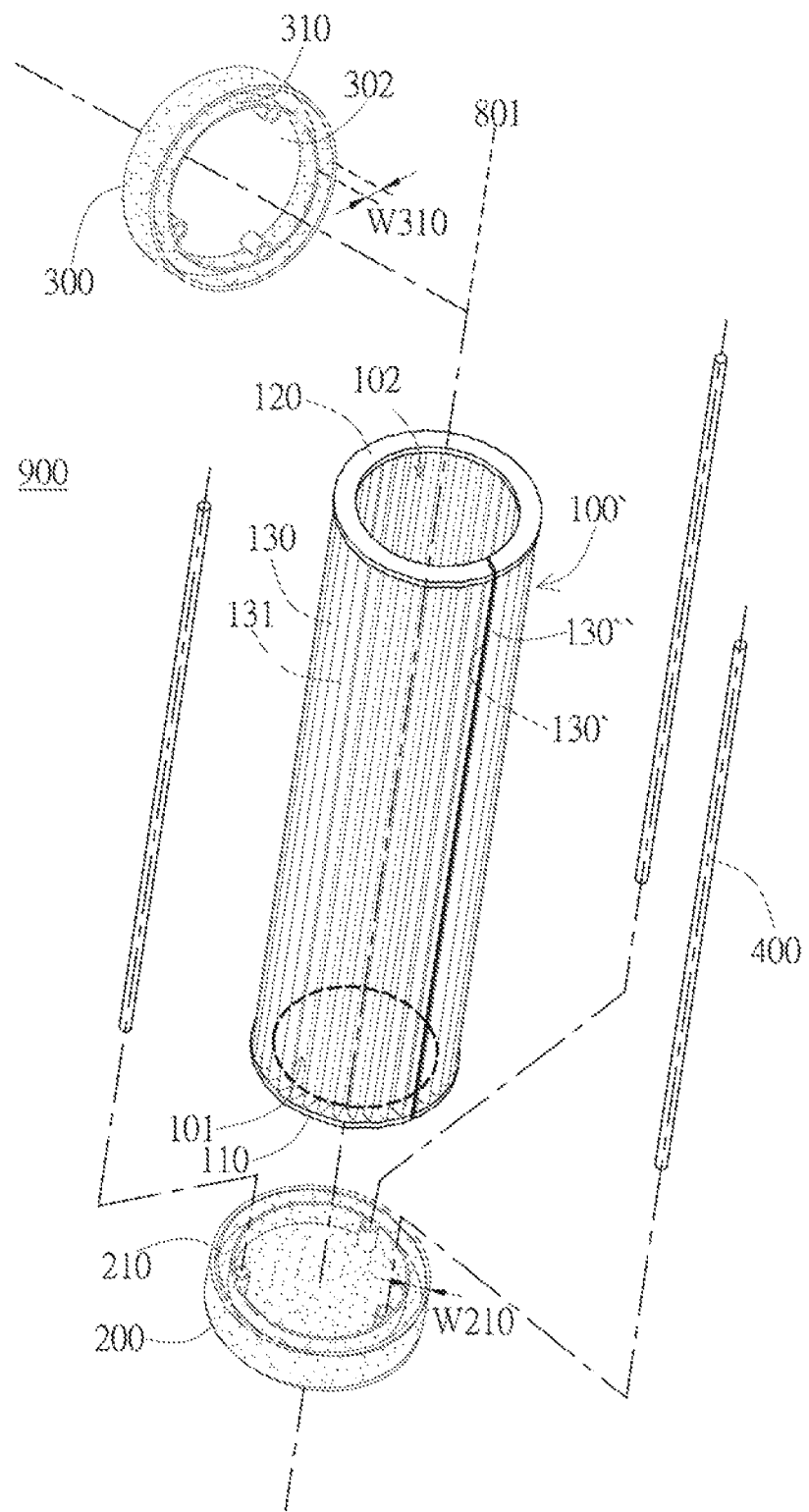
FIG. 5 is a schematic exploded view of a different embodiment of the cylindrical filter device according to the present invention.

As mentioned above, after the wavy filter screen 100 is curled to be wrapped into the cylindrical shape, the shape of the wavy filter screen may be fixed to be the cylindrical shape by respectively engaging the first flexible side strip 110 and the second flexible side strip 120 with the first groove 210 and the second groove 310. However, in different embodiments shown in FIGS. 4A to 4E, a wavy filter screen 100 may further include connecting pieces 140 for fixing the corresponding sides 130' and 130" of the connected first and last wavy structures. The connecting piece 140 may be a long strip structure with an S-shaped profile, and includes a first groove 141 and a second groove 142 with opposite opening directions. As shown in FIG. 4D, the two connecting pieces 140 may respectively engage with and be fixed to the sides 130' and 130" through their first grooves 141. Then, as shown in FIG. 4E, the two connecting pieces 140 may engage with each other respectively through their second grooves 142 so that the corresponding sides 130' and 130" of the connected first and last wavy structures are fixed. Further, the surfaces of the connecting pieces 140 are preferably smooth and not rough to increase airtightness. Additionally, the first groove 141 and the second groove 142 may engage more tightly with the elasticity of the sides 130' and 130". Additionally, after the wavy filter screen 100 is curled to be wrapped into the cylindrical shape, airflow penetrates through the wavy filter screen 100 from inside to outside of the cylindrical structure, that is, outwards strutting force is applied to the wavy filter screen 100 so that the two adjacent connecting pieces 140 engage more tightly. On the other hand, the wavy filter screen 100 itself has the considerable strength. However, in a different embodiment shown in FIG. 5, the cylindrical filter device 900 further includes a supporting device 400 disposed in the cylindrical structure 100' and assisting in supporting the wavy filter screen 100 to maintain the shape. The supporting device 400 preferably includes a plurality of rod pieces for connecting the sealing device 200 and the connecting device 300.

Figure 6A:
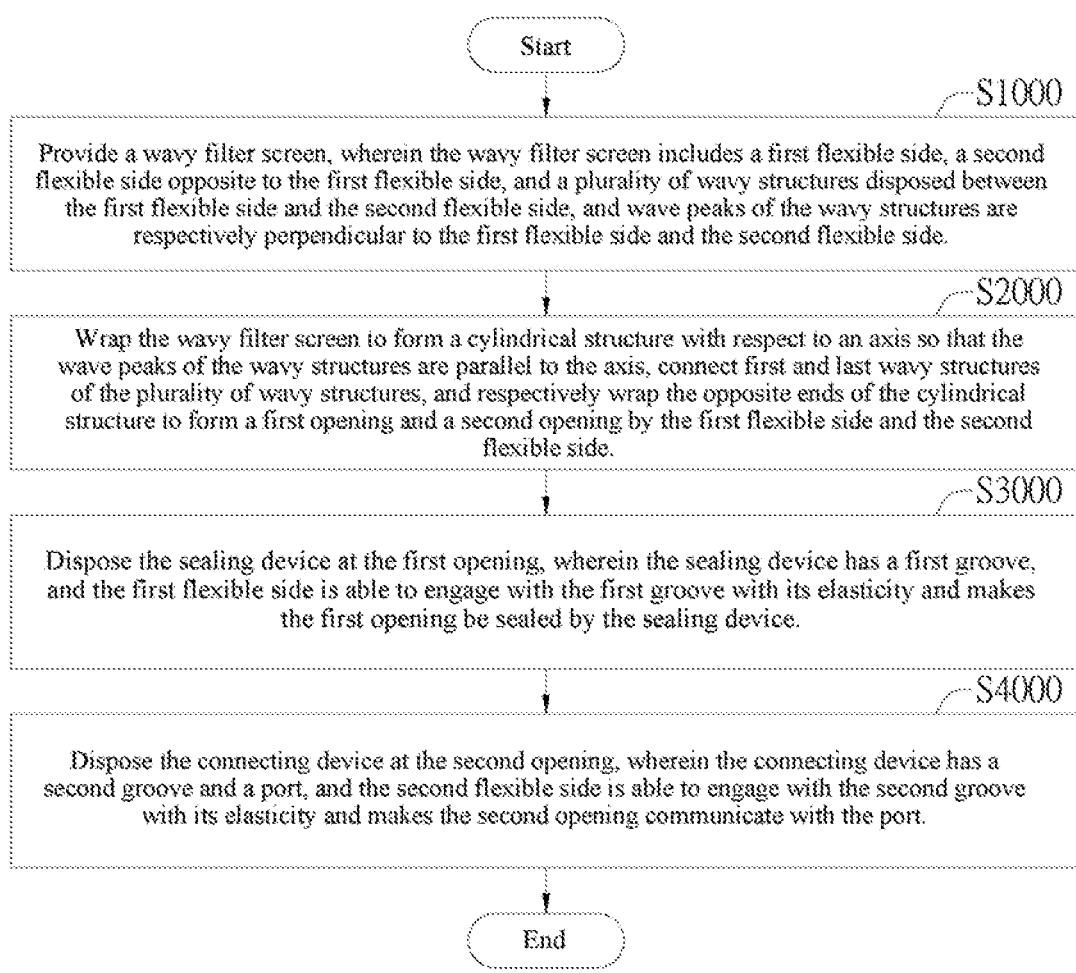
FIG. 6A is a schematic flow diagram of an embodiment of a manufacturing method of the cylindrical filter device according to the present invention.

Further, according to a flow diagram of an embodiment shown in FIG. 6A, the cylindrical filter device 900 is manufactured, for example, by the following steps.

Step S1000, a wavy filter screen is provided. The wavy filter screen includes a first flexible side strip, a second flexible side strip opposite to the first flexible side strip, and a plurality of wavy structures disposed between the first flexible side strip and the second flexible side strip. Ridge lines of the wavy structures are respectively connected with the first flexible side strip and the second flexible side strip. More specifically, the wavy filter screen 100 shown in FIG. 2C is provided.

Figure 6B:
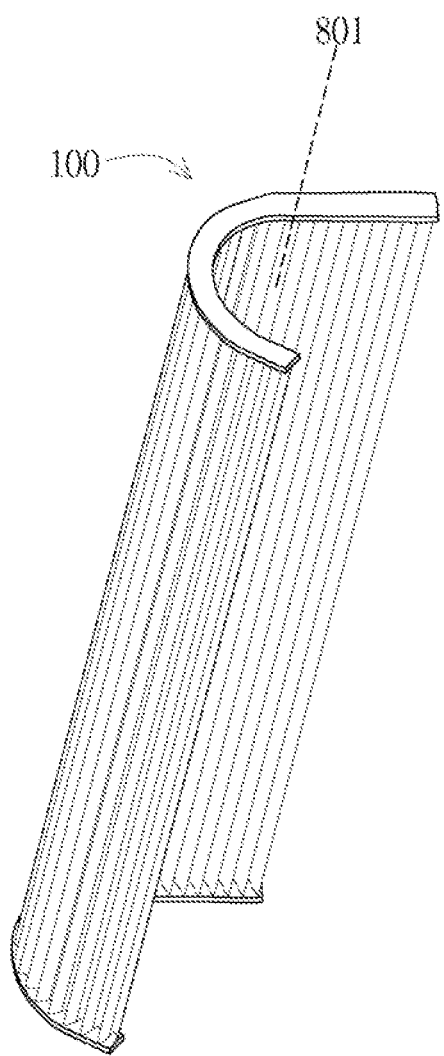
FIG. 6B is a schematic diagram of an embodiment with a curled wavy filter screen in the cylindrical filter device according to the present invention.

Step S2000, the wavy filter screen wraps to form a cylindrical structure with respect to an axis so that the ridge lines of the wavy structures are parallel to the axis. Corresponding sides of first and last wavy structures of the plurality of wavy structures are in direct or indirect connection in a separable manner. The opposite ends of the cylindrical structure are respectively wrapped to form a first opening and a second opening by the first flexible side strip and the second flexible side strip. More specifically, as shown in FIG. 6B, the wavy filter screen 100 wraps to form the cylindrical structure 100' shown in FIG. 2B with respect to the axis 801.

Step S3000, the sealing device is disposed at the first opening. The sealing device has a first groove. The first flexible side strip is able to engage with the first groove with its elasticity and makes the first opening be sealed by the sealing device. More specifically, as shown in FIG. 2B, the sealing device 200 is disposed at the first opening 101.

Step S4000, the connecting device is disposed at the second opening. The connecting device has a second groove and a port. The second flexible side strip is able to engage with the second groove with its elasticity and makes the second opening communicate with the port. More specifically, as shown in FIG. 2B, the engaging device 300 is disposed at the second opening 102. Through the above steps, the cylindrical filter device 900 shown in FIG. 2A can be manufactured.

Figure 6C:
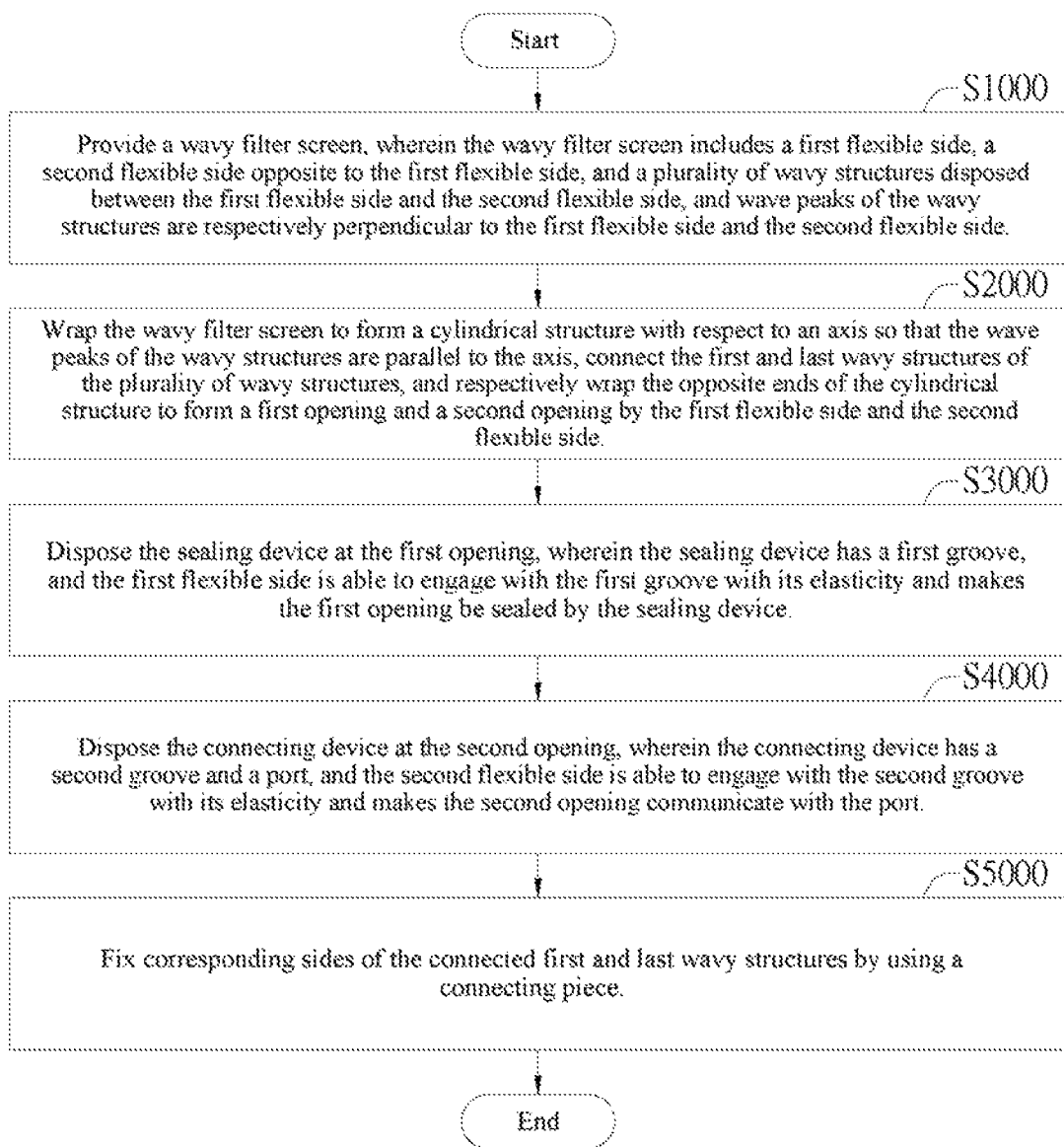
FIG. 6C is a schematic flow diagram of a different embodiment of the manufacturing method of the cylindrical filter device according to the present invention.

On the other hand, according to a different embodiment shown in FIG. 6C, the manufacturing of the cylindrical filter device 900 may further include step S5000: fixing the corresponding sides of the connected first and last wavy structures by using a connecting piece. More specifically, as shown in FIG. 4, the corresponding sides 130' and 130" of the connected first and last wavy structures are fixed by using the connecting piece 140.

Based on the above, compared with a conventional filter cartridge formed by being filled with the activated carbon particles, the cylindrical filter device 900 of the present invention has a low dust content and can reduce possible seepage of substances such as tar in the filter materials since the wavy filter screen 100 therein uses, for example, structures such as nonwoven fabrics to fix the filter materials such as the activated carbon, the ion exchange resin, the zeolite materials, the organic metal skeleton materials, the molecular sieves, the aluminum oxide, the silicon dioxide and the functional polymers, and these filter materials are not easily broken to generate fly dust along with the use time. Additionally, including filter material consumption reduction, the wavy filter screen 100 realizes light unit weight and labor-saving and convenient replacement and transportation. On the other hand, before being assembled with the sealing device 200 and the connecting device 300, the wavy filter screen 100 may be stored in a flat and uncurled manner, so that the storage space can be reduced, and the transportation is convenient.

In different embodiments, in order to enable the cylindrical filter device 900 of the present invention to reach a better effect, the thickness and the number of the wavy structures and the inner diameter (i.e., air inlet diameter) of the cylindrical structure may be designed, so that the value (Le) of (H×N×2)/D is in a range of 3 to 30. H is the thickness of the plurality of wavy structures, N is the number of the plurality of wavy structures, and D is the inner diameter of the cylindrical structure. 6 groups of embodiments are exemplified below and tested, and the results are shown in Table 1.

TABLE 1

|  | Embodiment 1 | Embodiment 2 | Embodiment 3 | Embodiment 4 | Embodiment 5 | Embodiment 6 |
| --- | --- | --- | --- | --- | --- | --- |
| H (mm) | 20 | 32 | 22 | 22 | 32 | 32 |
| N | 3 | 4 | 16 | 70 | 55 | 70 |
| D (mm) | 100 | 90 | 100 | 100 | 90 | 90 |
| Le | 1 | 3 | 7 | 31 | 39 | 50 |
| Relative pressure loss (Pa) | 50 | 55 | 60 | 80 | 100 | 100 |
| Relative equilibrium absorption capacity (g/kg) | 20 | 60 | 70 | 95 | 90 | 100 |

Samples of each group of above exemplified embodiments were put into a tested air passage. The fan frequency was regulated to confirm the test air speed and uniformity. Then, the relative pressure loss at the air speed was measured by a differential pressure gauge. Gas to be adsorbed was injected into the tested air passage by a branch pipe. The tail end gas concentration was measured till a test end point.

For a preferable embodiment, the relative pressure loss shall not be greater than 80 Pa, and the relative equilibrium absorption capacity shall not be smaller than 50 g/kg. Therefore, it can be known from the above table that when the value (Le) of (H×N×2)/D is in a range of 3 to 30, the relative pressure loss and the relative equilibrium absorption capacity can conform to expectations.

Figure 7A:
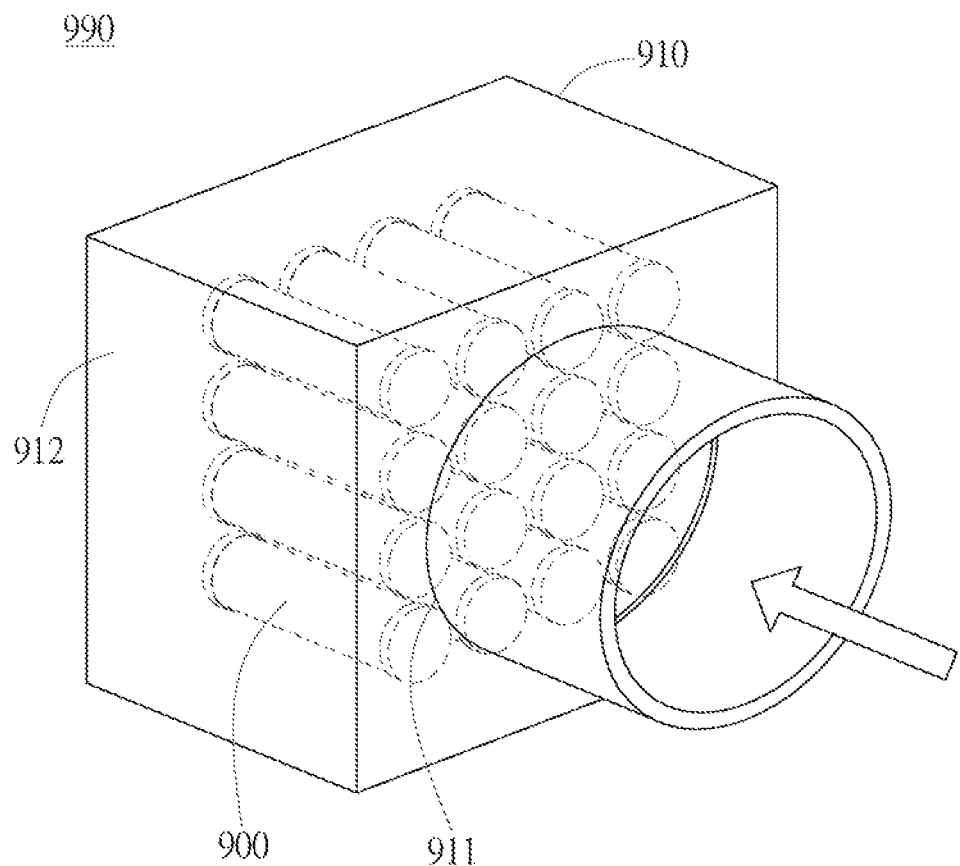
FIG. 7A is a schematic diagram of an embodiment of a filter system according to the present invention.

According to an embodiment shown in FIG. 7A, a filter system 990 of the present invention includes a cavity 910 and the above-mentioned cylindrical filter device 900. The cavity 910 includes a cavity inlet 911 and a first inner surface 912. The cylindrical filter device 900 is able to be installed at the first inner surface 912. In a local schematic diagram of the cylindrical filter device 900 being installed in front of the first inner surface 912 shown in FIG. 7B, the first inner surface 912 has a cavity outlet 913. The cylindrical filter device 900 is disposed and connected to the first inner surface 912 in a way that the axis 801 is perpendicular to the first inner surface 912 so as to make the port 302 communicate with the cavity outlet 913. Further, the axis 801 is preferably parallel to a horizontal plane. The cavity outlet 913, the port 302 and the cavity inlet 911 jointly form an airflow path. The wavy filter screen 100 is positioned on the airflow path. The cavity outlet 913 is able to be in butt joint with a building space, so that gas entering the building space can be filtered by the cylindrical filter device 900. The cavity inlet 911 is preferably positioned on the opposite side of the first inner surface 912.

Figure 7B:
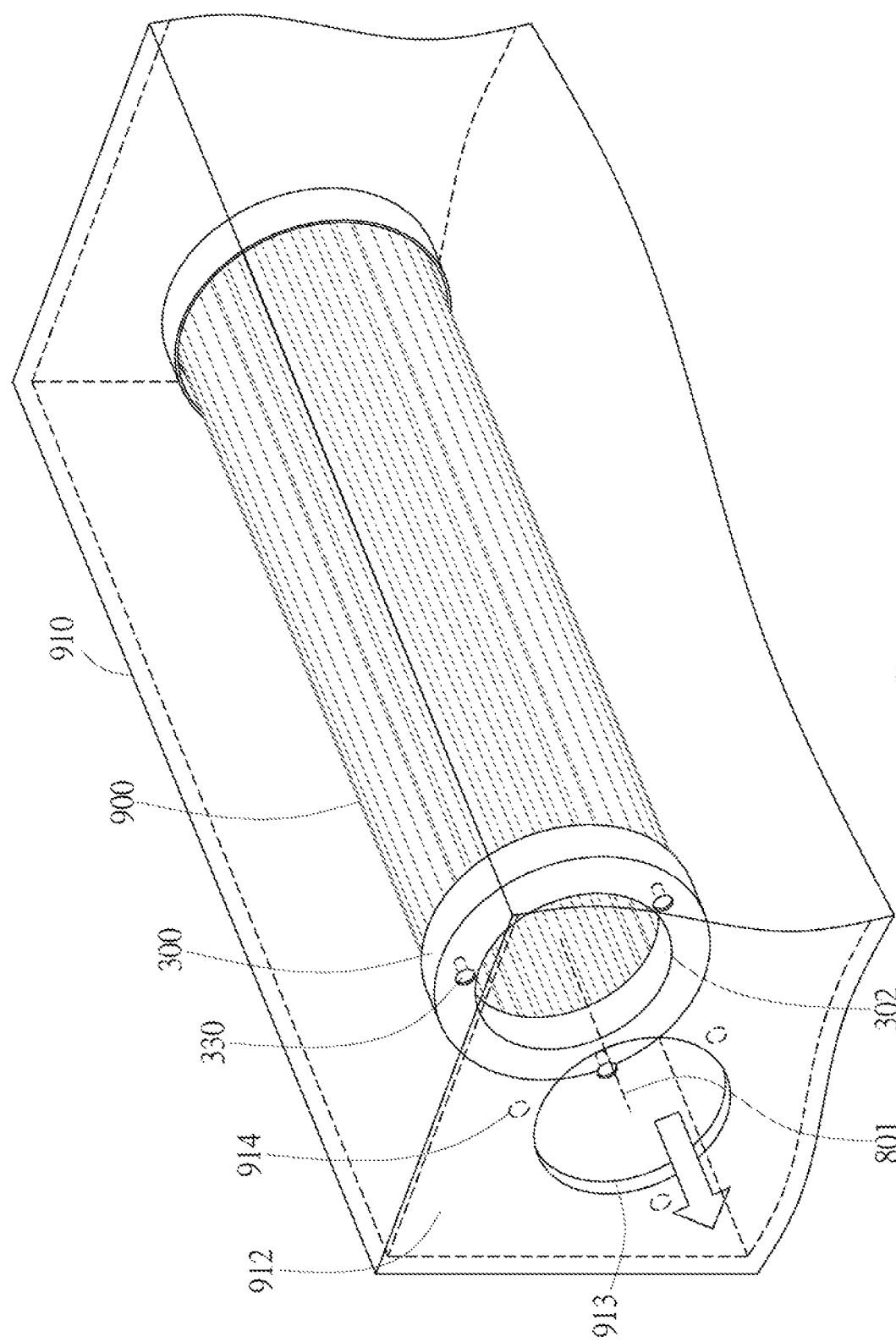
FIG. 7B is a local schematic diagram of the cylindrical filter device being installed in front of a first inner surface.

On the other hand, according to an embodiment shown in FIG. 7B, the cavity 910 further includes a butt joint device 914 disposed on the first inner surface 912 and corresponding to the position of the cavity outlet 913. The connecting device 300 is in butt joint with the butt joint device 914 so that the cylindrical filter device 900 is fixed to the first inner surface 912, and the port 302 is communicated with the cavity outlet 913. More specifically, the butt joint device 914 includes, for example, a porous structure. An engaging pin 330 capable of extending into the porous structure is disposed on the outer surface of the connecting device 300. By extending the engaging pin 330 into the butt joint device 914 and engaging the engaging pin with the butt joint device, the cylindrical filter device 900 can be fixed to the first inner surface 912.

As mentioned above, according to the cylindrical filter device 900 of the present invention, the filter system 990 using the cylindrical filter device 900 has a lower dust content since the wavy filter screen 100 therein uses, for example, structures such as the nonwoven fabrics to fix the activated carbon, and the activated carbon is not easily broken to generate fly dust along with the use time. Additionally, the cylindrical filter device 900 realizes light weight and labor-saving and convenient replacement. Therefore, the maintenance of the filter system 990 is easier.

[48] Although the foregoing descriptions and accompanying drawings have disclosed preferred embodiments of the present invention, it is to be understood that various additions, modifications, and replacements are possible in the preferred embodiments of the present invention without departing from the spirit and scope of the principles of the present invention as defined by the appended claims. It will be appreciated by those of ordinary skill in the art that the present invention may be used with many modifications, including forms, structures, arrangements, proportions, materials, components, and assemblies. The embodiments disclosed herein are, therefore, to be considered in all respects as illustrative and not restrictive. The scope of the present invention should be defined by the appended claims, including legal equivalents thereof, and not limited to the foregoing descriptions.

SYMBOLIC DESCRIPTION 70 denotes a conventional activated carbon filter cartridge.
71 denotes a reticular structure.
72 denotes a reticular structure.
73 denotes an activated carbon particle.
74 denotes a cover body.

75 denotes a cover body.
100 denotes a wavy filter screen.
100' denotes a cylindrical structure.
101 denotes a first opening.
102 denotes a second opening.
110 denotes a first flexible side strip.
120 denotes a second flexible side strip.
130 denotes a wavy structure.
130' denotes a corresponding side of a first wavy structure.
130" denotes a corresponding side of a last wavy structure.
131 denotes a ridge line.
140 denotes a connecting piece.
141 denotes a first groove.
142 denotes a second groove.
200 denotes a sealing device.
210 denotes a first groove.
211 denotes an engaging structure.
300 denotes a connecting device.
302 denotes a port.
310 denotes a second groove.
330 denotes an engaging pin.
400 denotes a supporting device.
801 denotes an axis.
900 denotes a cylindrical filter device.
910 denotes a cavity.
911 denotes a cavity inlet.
912 denotes a first inner surface.
913 denotes a cavity outlet.
914 denotes a butt joint device.
990 denotes a filter system.
S1000 denotes a step.
S2000 denotes a step.
S3000 denotes a step.
S4000 denotes a step.
S5000 denotes a step.
W110 denotes the height of the first flexible side strip.
W120 denotes the height of the second flexible side strip.
W130 denotes the thickness of the wavy structure.
W210 denotes the width of the first groove.
W310 denotes the width of the second groove.

What is claimed is:

1. A cylindrical filter device, comprising:
a wavy filter screen, comprising:
a plurality of wavy structures;
a first flexible side strip disposed on one side of the plurality of wavy structures, and is perpendicular to ridge lines of the plurality of wavy structures, wherein the height of the first flexible side strip is greater than the thickness of the plurality of wavy structures;
a second flexible side strip disposed on one side of the plurality of wavy structures opposite to the first flexible side, and is perpendicular to ridge lines of the plurality of wavy structures, wherein the height of the second flexible side strip is greater than the thickness of the plurality of wavy structures, wherein the opposite ends of each ridge lines of the wavy structures are respectively connected with the first flexible side strip and the second flexible side strip;
wherein ridge lines of the wavy structures are respectively perpendicular to the first flexible side strip and the second flexible side strip; the wavy filter screen wraps to form a cylindrical structure with respect to an axis so that the ridge lines of the wavy structures are parallel to the axis; corresponding sides of first and last wavy structures of the plurality of wavy structures are in direct or indirect connection in a separable manner; and the opposite ends of the cylindrical structure are respectively wrapped to form a first opening and a second opening by the first flexible side and the second flexible side;
a sealing device, disposed at the first opening, wherein the sealing device has a first groove, wherein the width of the first groove is slightly smaller than the height of the first flexible side strip for the first flexible side strip to engage with the first groove with its elasticity and make the first opening be sealed by the sealing device; and
a connecting device, disposed at the second opening, wherein the connecting device has a second groove and a port, wherein the width of the second groove is slightly smaller than the height of the second flexible side strip for the second flexible side strip to engage with the second groove with its elasticity and makes the second opening communicate with the port.

2. The cylindrical filter device according to claim 1, wherein the wavy filter screen further comprises a connecting piece for fixing the corresponding sides of the connected first and last wavy structures.

3. A filter system, comprising:
a cavity, comprising a cavity inlet and a first inner surface with a cavity outlet; and
the cylindrical filter device according to claim 2, disposed and connected to the first inner surface in a way that the axis is perpendicular to the first inner surface so as to make the port communicate with the cavity outlet;
wherein the cavity outlet, the port and the cavity inlet jointly form an airflow path, and the wavy filter screen is positioned on the airflow path.

4. A usage of the cylindrical filter device according to claim 2, used to filter gas entering a building space.

5. The cylindrical filter device according to claim 1, further comprising a supporting device, disposed in the cylindrical structure and respectively connected and supported between the sealing device and the connecting device.

6. The cylindrical filter device according to claim 5, wherein the wavy filter screen is an activated carbon filter screen.

7. A filter system, comprising:
a cavity, comprising a cavity inlet and a first inner surface with a cavity outlet; and
the cylindrical filter device according to claim 6, disposed and connected to the first inner surface in a way that the axis is perpendicular to the first inner surface so as to make the port communicate with the cavity outlet;
wherein the cavity outlet, the port and the cavity inlet jointly form an airflow path, and the wavy filter screen is positioned on the airflow path.

8. A filter system, comprising:
a cavity, comprising a cavity inlet and a first inner surface with a cavity outlet; and
the cylindrical filter device according to claim 5, disposed and connected to the first inner surface in a way that the axis is perpendicular to the first inner surface so as to make the port communicate with the cavity outlet;
wherein the cavity outlet, the port and the cavity inlet jointly form an airflow path, and the wavy filter screen is positioned on the airflow path.

9. A usage of the cylindrical filter device according to claim 5, used to filter gas entering a building space.

10. The cylindrical filter device according to claim 1, wherein
the value of $(H \times N \times 2)/D$ is in a range of 3 to 30,
H is the thickness of the plurality of wavy structures, N is the number of the plurality of wavy structures, and D is the inner diameter of the cylindrical structure.

11. A filter system, comprising:
a cavity, comprising a cavity inlet and a first inner surface with a cavity outlet; and
the cylindrical filter device according to claim 10, disposed and connected to the first inner surface in a way that the axis is perpendicular to the first inner surface so as to make the port communicate with the cavity outlet;
wherein the cavity outlet, the port and the cavity inlet jointly form an airflow path, and the wavy filter screen is positioned on the airflow path.

12. A filter system, comprising:
a cavity, comprising a cavity inlet and a first inner surface with a cavity outlet; and
the cylindrical filter device according to claim 1, disposed and connected to the first inner surface in a way that the axis is perpendicular to the first inner surface so as to make the port communicate with the cavity outlet;
wherein the cavity outlet, the port and the cavity inlet jointly form an airflow path, and the wavy filter screen is positioned on the airflow path.

13. A filter system, comprising:
a cavity, comprising a cavity inlet and a first inner surface with a cavity outlet; and
the cylindrical filter device according to claim 1, disposed and connected to the first inner surface in a way that the axis is perpendicular to the first inner surface so as to make the port communicate with the cavity outlet;
wherein the cavity outlet, the port and the cavity inlet jointly form an airflow path, and the wavy filter screen is positioned on the airflow path.

14. The filter system according to claim 13, wherein the cavity further comprises a butt joint device disposed on the first inner surface and corresponding to the position of the cavity outlet, and the connecting device is in butt joint with the butt joint device so that the cylindrical filter device is fixed to the first inner surface, and the first opening is communicated with the cavity outlet.

15. The filter system according to claim 13, wherein the cavity inlet is positioned on the opposite side of the first inner surface.

16. The filter system according to claim 13, wherein the axis is parallel to a horizontal plane.

17. A usage of the cylindrical filter device according to claim 1, used to filter gas entering a building space.

18. A manufacturing method of a cylindrical filter device, comprising:
providing a wavy filter screen, wherein the wavy filter screen comprises:
a plurality of wavy structures;
a first flexible side strip disposed on one side of the plurality of wavy structures, and is perpendicular to ridge lines of the plurality of wavy structures, wherein the height of the first flexible side strip is greater than the thickness of the plurality of wavy structures,
a second flexible side strip disposed on one side of the plurality of wavy structures opposite to the first flexible side, and is perpendicular to ridge lines of the plurality of wavy structures, wherein the height of the second flexible side strip is greater than the thickness of the plurality of wavy structures wherein the opposite ends of each ridge lines of the wavy structures are respectively connected with the first flexible side strip and the second flexible side strip; wherein ridge lines of the wavy structures are respectively perpendicular to the first flexible side strip and the second flexible side strip;
wrapping the wavy filter screen to form a cylindrical structure with respect to an axis so that the ridge lines of the wavy structures are parallel to the axis, directly or indirectly connecting corresponding sides of first and last wavy structures of the plurality of wavy structures in a separable manner, and respectively wrapping the opposite ends of the cylindrical structure to form a first opening and a second opening by the first flexible side strip and the second flexible side strip;
disposing a sealing device at the first opening, wherein the sealing device has a first groove, wherein the width of the first groove is slightly smaller than the height of the first flexible side strip for the first flexible side strip to engage with the first groove with its elasticity and makes the first opening be sealed by the sealing device; and
disposing the connecting device at the second opening, wherein the connecting device has a second groove and a port, wherein the width of the second groove is slightly smaller than the height of the second flexible side strip for the second flexible side to engage with the second groove with its elasticity and makes the second opening communicate with the port.

19. The manufacturing method of a cylindrical filter device according to claim 18, further comprising: fixing the corresponding sides of the connected first and last wavy structures by using a connecting piece.

* * * * *